(12) United States Patent
Vinciarelli et al.

(10) Patent No.: US 7,236,086 B1
(45) Date of Patent: Jun. 26, 2007

(54) POWER CONVERTER CONFIGURATION, CONTROL, AND CONSTRUCTION

(75) Inventors: Patrizio Vinciarelli, Boston, MA (US); Louis A. Bufano, Tewksbury, MA (US)

(73) Assignee: VLT, Inc., Sunnyvale, CA (US)

( * ) Notice: Subject to any disclaimer, the term of this patent is extended or adjusted under 35 U.S.C. 154(b) by 878 days.

(21) Appl. No.: 09/717,453

(22) Filed: Nov. 21, 2000

Related U.S. Application Data

(60) Division of application No. 08/631,793, filed on Apr. 10, 1996, now Pat. No. 6,208,531, which is a continuation of application No. 08/077,011, filed on Jun. 14, 1993, now abandoned.

(51) Int. Cl.
*H04M 11/04* (2006.01)

(52) U.S. Cl. ............... 340/310.01; 340/310.11; 340/464; 363/16; 363/17; 363/20; 363/49

(58) Field of Classification Search .......... 340/310.01, 340/464, 310.11; 363/16, 17, 20, 49
See application file for complete search history.

(56) References Cited

U.S. PATENT DOCUMENTS

| | | | |
|---|---|---|---|
| 2,847,651 A | 8/1958 | Schamanek | |
| 2,896,028 A | 7/1959 | Mackey | |
| 3,226,629 A | 12/1965 | Hazzard | |
| 3,277,416 A | 10/1966 | Barr | |
| 3,458,843 A | 7/1969 | Lord | |
| 3,465,274 A | 9/1969 | Proctor | |
| 3,483,499 A | 12/1969 | Lugten | |
| 3,522,509 A * | 8/1970 | Hasenbalg | 363/15 |
| 3,622,928 A | 11/1971 | Lee | |
| 3,771,040 A | 11/1973 | Fletcher et al. | |
| 3,798,059 A | 3/1974 | Astle et al. | |
| 3,840,795 A * | 10/1974 | Roszyk et al. | 320/108 |
| 3,851,287 A | 11/1974 | Miller et al. | |
| 4,012,703 A | 3/1977 | Chamberlayne | |
| 4,024,449 A | 5/1977 | Burrie et al. | |
| 4,080,585 A | 3/1978 | Molthen | |
| 4,201,965 A | 5/1980 | Onyshkevych | |
| 4,383,292 A | 5/1983 | Onodera et al. | |
| 4,415,959 A | 11/1983 | Vinciarelli | |
| 4,439,821 A | 3/1984 | Grippe | |
| 4,441,146 A | 4/1984 | Vinciarelli | |

(Continued)

FOREIGN PATENT DOCUMENTS

DE  2054457  5/1972

(Continued)

OTHER PUBLICATIONS

Letter from R.E. Lowe, General Electric, Jan. 14, 1982.

(Continued)

*Primary Examiner*—Tai Nguyen
(74) *Attorney, Agent, or Firm*—Fish & Richardson P.C.

(57) ABSTRACT

A transformer having galvanically isolated windings defines a primary side and a secondary side of a power conversion apparatus. A switch couples power from a source on the primary side via the transformer to a load on the secondary side. A first circuit assembly has primary-side circuitry galvanically coupled to a port for connection to an input power source. The primary-side circuitry includes a primary-side communicator for sending or receiving control information used in controlling operation of the power conversion apparatus. A second circuit assembly has secondary-side circuitry galvanically coupled to a port for connection to a load. The secondary-side circuitry includes a secondary-side communicator for sending or receiving the control information. The first and second circuit assemblies are mechanically separable as assemblies from one another, are galvanically isolated from one another, and are configured to be placed in positions relative to one another to enable the primary-side and secondary-side communicators to cooperate to pass the control information.

15 Claims, 15 Drawing Sheets

U.S. PATENT DOCUMENTS

| | | | |
|---|---|---|---|
| 4,455,545 A | 6/1984 | Shelly | |
| 4,485,368 A | 11/1984 | Messé | |
| 4,622,627 A | 11/1986 | Rodriguez et al. | |
| 4,658,799 A | 4/1987 | Kusaka et al. | |
| 4,675,797 A | 6/1987 | Vinciarelli | |
| 4,683,528 A | 7/1987 | Snow et al. | |
| 4,709,315 A | 11/1987 | Ramos | |
| 4,712,160 A | 12/1987 | Sato et al. | |
| 4,761,724 A | 8/1988 | Brown et al. | |
| 4,811,348 A | 3/1989 | Arimoto et al. | |
| 4,837,452 A | 6/1989 | Peterson | |
| 4,853,668 A | 8/1989 | Bloom | |
| 4,862,339 A | 8/1989 | Inou et al. | |
| 4,868,732 A | 9/1989 | Gillett et al. | |
| 4,873,757 A | 10/1989 | Williams | |
| 4,885,673 A | 12/1989 | Philippe | |
| 4,901,215 A | 2/1990 | Martin-Lopez | |
| 4,914,381 A | 4/1990 | Narod | |
| 4,930,059 A | 5/1990 | Rütt | |
| 4,942,352 A * | 7/1990 | Sano | 320/134 |
| 4,994,078 A | 2/1991 | Jarvik | |
| 4,996,638 A | 2/1991 | Orr | |
| 5,008,797 A | 4/1991 | Patel et al. | |
| 5,019,955 A | 5/1991 | Hoeksma | |
| 5,063,489 A | 11/1991 | Inaba | |
| 5,105,095 A | 4/1992 | Rudy, Jr. et al. | |
| 5,132,888 A | 7/1992 | Lo et al. | |
| 5,138,543 A * | 8/1992 | Harm et al. | 363/21.08 |
| 5,155,676 A | 10/1992 | Spreen | |
| 5,161,098 A | 11/1992 | Balakrishnan | |
| 5,162,663 A | 11/1992 | Combs et al. | |
| 5,181,170 A * | 1/1993 | Huang et al. | 363/21.04 |
| 5,282,122 A | 1/1994 | Summer | |
| 5,289,359 A | 2/1994 | Ziermann | |
| 5,365,403 A | 11/1994 | Vinciarelli et al. | |
| 5,384,691 A | 1/1995 | Neugebauer et al. | |
| 5,443,534 A | 8/1995 | Vinciarelli et al. | |
| 6,107,860 A | 8/2000 | Vinciarelli | |
| 6,208,531 B1 * | 3/2001 | Vinciarelli et al. | 363/21.07 |

FOREIGN PATENT DOCUMENTS

| | | |
|---|---|---|
| DE | 3501052 | 7/1986 |
| DE | 3831610 | 3/1990 |
| FR | 2 641 438 | 7/1990 |
| GB | 2 238 915 | 6/1991 |
| JP | 52-115116 | 9/1977 |
| JP | 54-110424 | 8/1979 |
| JP | 55-154712 | 12/1980 |
| JP | 62-12194 | 1/1987 |
| JP | 63-198387 | 12/1988 |
| JP | 3-97386 | 10/1991 |
| JP | 4-352306 | 12/1992 |

OTHER PUBLICATIONS

General Electric ad, "GE SwitchMod™ Power Supply Kit".
General Electric brochure, SwitchMod™, 6PM Series.
General Electric brochure, "Switching Power Supply", 6PS Series.
Altmann et al., "Printed Delay Line", IBM Technical Disclosure Bulletin, vol. 8, No. 5, Oct. 1965, pp. 741-742.
Pelly et al., "Power MOSFETs Take the Load Off Switching Supply Design", Electronic Design, Feb. 17, 1983, pp. 135-139.
Miura et al., "New Power Supply For Audio Power Amplifiers", IEEE Transactions on Consumer Electronics, vol. CE-24, No. 3, Aug. 1978.
Wong, "Design Entry, 'Compact Power Unit Raises Supply's Switching Rate By An Order of Magnitude'", Electronics Design, Apr. 1985, pp. 161-168.
Powercube Catalog, "Icecube™ Current Mode DC-DC Converter".
Powercube Selection Guide.
Letter from Joseph DiBrigida, Computer Products to Powercube Corp, Aug. 14, 1981, with specification.
Powercube brochure.
Powercube brochure, Application Notes, Efficiency Considerations for CIRKITBLOCK® Modules.
Powercube brochure, "Input Set Model ASPG".
Powercube brochure, Application Notes, "Switching Preregulators".
Powercube brochure, "The Magnetic Switching Regulator 5TR200 and STR160 Transformer Isolated Output Modules Regulated DC Power Converter".
Powercube brochure, "Quad Output Miniature DC—DC Converter".
Powercube brochure, "The Magnetic Switching Regulator 5TR200 and 5TR160 Transformer Isolated Output Modules Regulated DC Power Converter".
Powercube Brochure, Application Notes, Efficiency Considerations for CIRKITBLOCK Modules.
Powercube Brochure, ICECUBE Condensed Catalog.

\* cited by examiner

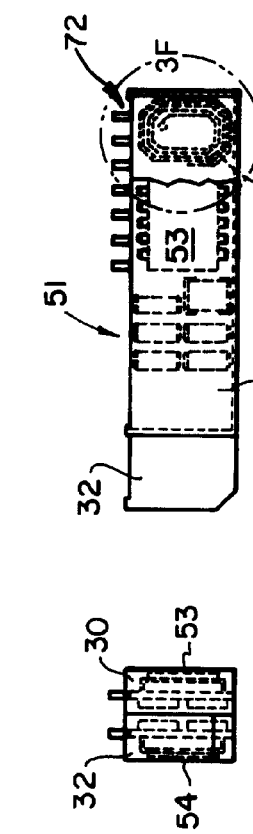
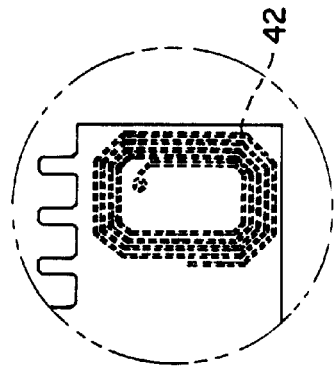
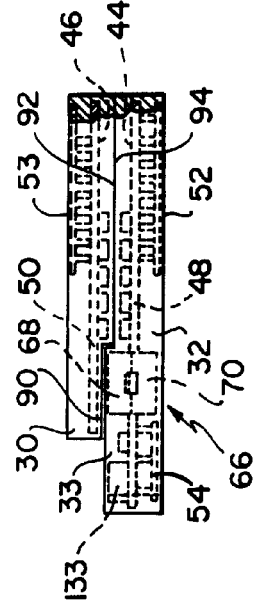
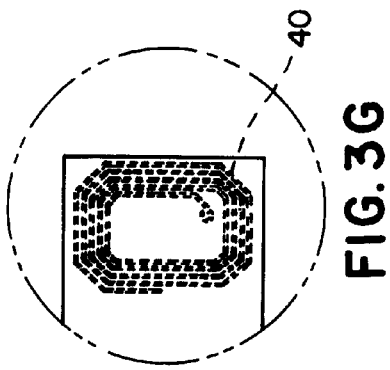
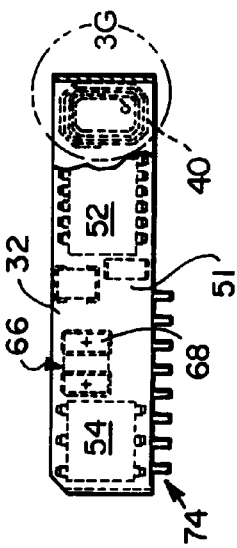

| Vin (Volts) | Vout (Volts) | R1 (Kohm) | R2 (Kohm) | FET Type | Vdmax (Volts) | R3 (Kohm) | R4 (Kohm) |
|---|---|---|---|---|---|---|---|
| 300 | 3.3 | 26.40 | 82.50 | IRFBC30 | 550 | 1,375.0 | 20.30 |
| 300 | 5 | 40.00 | 40.00 | IRFBC30 | 550 | 1,375.0 | 20.30 |
| 300 | 12 | 96.00 | 25.26 | IRFBC30 | 550 | 1,375.0 | 20.30 |
| 300 | 15 | 120.00 | 24.00 | IRFBC30 | 550 | 1,375.0 | 20.30 |
| 300 | 24 | 192.00 | 22.33 | IRFBC30 | 550 | 1,375.0 | 20.30 |
| 300 | 28 | 224.00 | 21.96 | IRFBC30 | 550 | 1,375.0 | 20.30 |
| 48 | 3.3 | 26.40 | 82.50 | IRF540 | 95 | 237.5 | 21.84 |
| 48 | 5 | 40.00 | 40.00 | IRF540 | 95 | 237.5 | 21.84 |
| 48 | 12 | 96.00 | 25.26 | IRF540 | 95 | 237.5 | 21.84 |
| 48 | 15 | 120.00 | 24.00 | IRF540 | 95 | 237.5 | 21.84 |
| 48 | 24 | 192.00 | 22.33 | IRF540 | 95 | 237.5 | 21.84 |
| 48 | 28 | 224.00 | 21.96 | IRF540 | 95 | 237.5 | 21.84 |
| 28 | 3.3 | 26.4 | 82.50 | IRFZ44 | 56 | 140.0 | 23.33 |
| 28 | 5 | 40.00 | 40.00 | IRFZ44 | 56 | 140.0 | 23.33 |
| 28 | 12 | 96.00 | 25.26 | IRFZ44 | 56 | 140.0 | 23.33 |
| 28 | 15 | 120.00 | 24.00 | IRFZ44 | 56 | 140.0 | 23.33 |
| 28 | 24 | 192.00 | 22.33 | IRFZ44 | 56 | 140.0 | 23.33 |
| 28 | 28 | 224.00 | 21.96 | IRFZ44 | 56 | 140.0 | 23.33 |

FIG. 9

Vref1 = 2.5 Volts
Vref2 = 8 Volts

Primary Lobe Resistor Values

| Vin (Volts) | R3 (Kohm) | R4 (Kohm) |
|---|---|---|
| 300 | 1,375.0 | 20.30 |
| 48 | 237.5 | 21.84 |
| 28 | 140.0 | 23.33 |

Vref1 = 2.5 Volts

FIG. 10A

Secondary Lobe Resistor Values

| Vout (Volts) | R1 (Kohm) | R2 (Kohm) |
|---|---|---|
| 3.3 | 26.40 | 82.50 |
| 5 | 40.00 | 40.00 |
| 12 | 96.00 | 25.26 |
| 15 | 120.00 | 24.00 |
| 24 | 192.00 | 22.33 |
| 28 | 224.00 | 21.96 |

Vref2 = 8 Volts

FIG. 10B

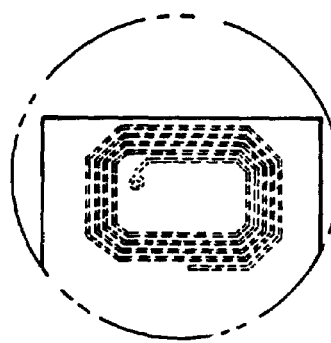
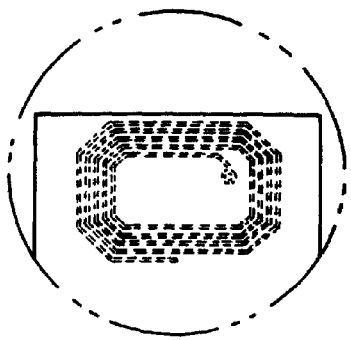
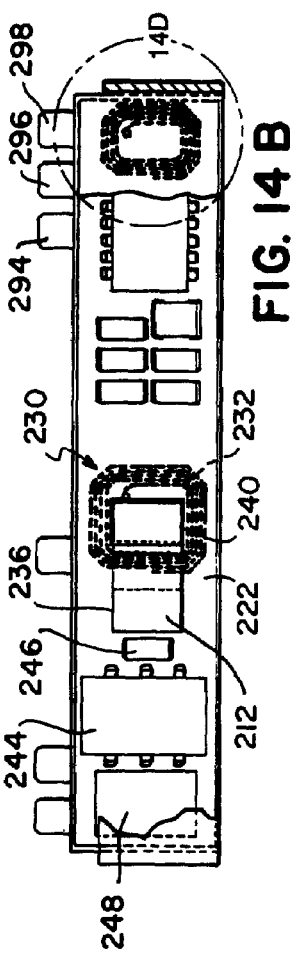
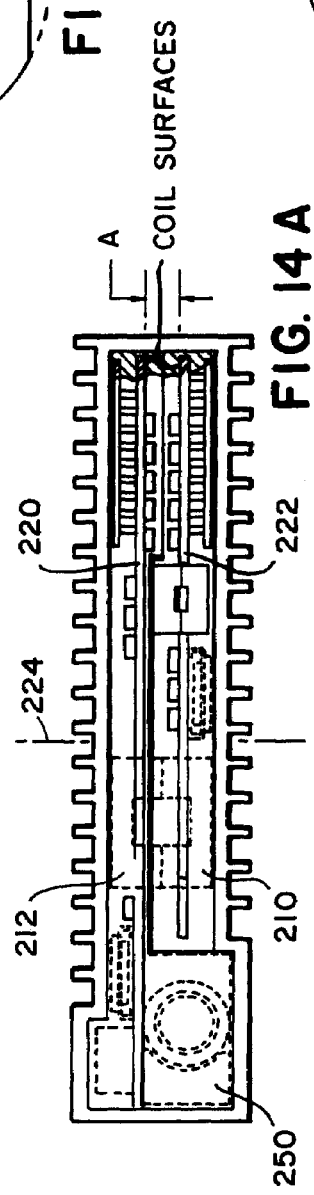
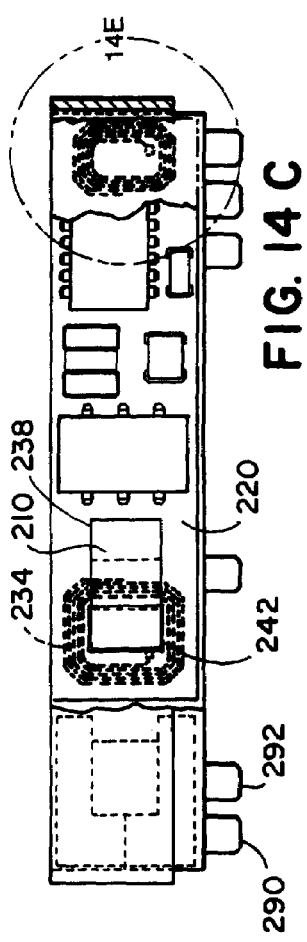

POWER CONVERTER CONFIGURATION, CONTROL, AND CONSTRUCTION

CROSS REFERENCE TO RELATED APPLICATION

This application is a DIV of Ser. No. 08/631,793 filed on Apr. 10, 1996 now U.S. Pat. No. 6,208,531 which is a CON of Ser. No. 08/077,011 filed on Jun. 14, 1993 now abandoned

BACKGROUND OF THE INVENTION

This invention relates to power converter configuration, control, and construction.

Power converters generally include power transfer components (e.g., transformers and switches) and control circuitry which governs the operation of the power transfer components to achieve desired operating characteristics. For example, in some zero current switching (ZCS) converters of the kind sold by Vicor Corporation, Andover, Mass. (see also U.S. Pat. Nos. 4,415,959, 4,441,146, and 4,675,797, incorporated by reference), the power transfer components are discrete components mounted on a printed circuit board.

Referring to FIG. 1, in a simple version of a ZCS converter, a main power transformer 10 has primary and secondary windings 12, 14 which define primary and secondary electrical sides 16, 18 of the converter. Power conversion occurs by quantized transfer of energy from the primary side to the secondary side during a succession of energy transfer cycles. Each energy transfer cycle begins and ends with the closing and subsequent opening of a switch 20 at times when the current through the switch is essentially zero.

A control circuit 22 governs the opening and closing of switch 20 so that the energy transfer cycles occur with a frequency that is varied to cause the converter to supply the output power at a desired voltage. A voltage sensor 24 detects Vout and information about Vout (i.e. control information) is fed back to a portion of the control circuit which turns the primary side switch on and off.

It is often important (e.g., for safety reasons) that the primary and secondary sides of the converter be isolated from one another. As a result, the transfer of control information from the secondary to primary sides is usually done via an isolation device (e.g., a transformer in which two windings are coupled by a permeable core, an opto-coupler, or a discrete light emitting device located adjacent to a discrete light detecting device) which is included in the control circuitry.

During construction of the converter, the control circuitry typically is formed by mounting discrete electronic components on the same circuit board that bears the power conversion parts, or on separate daughter boards which form an assembly to be mounted on the main power conversion board (see U.S. patent application Ser. No. 07/947,937, Providing Electrical Components for Circuit Assembly, filed Sep. 21, 1992, incorporated by reference).

Powercube Corporation and General Electric Corporation have offered modular building blocks (e.g., AC rectifier blocks, PWM conversion blocks, control assembly blocks, output rectifier blocks) from which a complete switching power supply could be assembled, by connecting blocks together by means of wires, electrical connectors or traces on a circuit board.

SUMMARY OF THE INVENTION

In general, in one aspect, the invention features a power conversion apparatus. A transformer having galvanically isolated windings defines a primary side and a secondary side of the power conversion apparatus. A switch couples power from a source on the primary side via the transformer to a load on the secondary side. A first circuit assembly has primary-side circuitry galvanically coupled to a port for connection to an input power source. The primary-side circuitry includes a primary-side communicator for sending or receiving control information used in controlling operation of the power conversion apparatus. A second circuit assembly has secondary-side circuitry galvanically coupled to a port for connection to a load. The secondary-side circuitry includes a secondary-side communicator for sending or receiving the control information. The first and second circuit assemblies are mechanically separable as assemblies from one another, are galvanically isolated from one another, and are configured to be placed in positions relative to one another to enable the primary-side and secondary-side communicators to cooperate to pass the control information.

Embodiments of the invention include the following features. The communicators comprise windings and the control information is passed by electromagnetic coupling between them. There is circuitry for passing the information by modulating a carrier. The coupling may be achieved without a permeable core linking the windings, or there may be a permeable core linking the windings. The windings are formed on surfaces of separate circuit boards. The first and second circuit assemblies are enclosed respectively in mechanically separate protective housings formed, for example, of a dielectric encapsulant. The housings of the two assemblies meet at respective mating surfaces and coupling occurs across the mating surfaces. Power conversion components may be mounted on the same circuit board as the assemblies.

In general, in another aspect, the invention features a control circuit apparatus. First circuitry is encapsulated to form a first discrete physical unit and is connected to respond to control information received from second circuitry encapsulated in a second discrete physical unit. The two physical units respectively include subparts of a device for conveying the control information via a galvanically isolated path.

In general, in another aspect, the invention features a method of providing control circuitry for use in manufacturing individual power converters in a mode in which the individual power converters all conform to a single general design, and different ones of the power converters have different operating characteristics achieved by different components used within the single general design, Supplies of different versions of a first discrete control circuit are provided as are supplies of different versions of a second discrete control circuit. For each of the individual power converters being manufactured, different versions of the first and second control circuits are selected to achieve desired operating characteristics in the power converters. The selected different versions are incorporated into each converter in orientations to permit them to communicate control information between them to achieve the desired operating characteristics.

In general, in another aspect, the invention features a power converter. A primary circuit assembly includes a primary winding of a power conversion transformer. A switch influences the coupling of power from an input port of the primary assembly to the primary winding. Primary side control circuitry opens and closes the switch. A secondary circuit assembly includes a secondary winding of the power conversion transformer, and control circuitry for receiving control information useful in determining when to open and close the switch. The primary and secondary circuit assemblies are encapsulated as distinct components and held in proximity to one another to permit coupling between the primary and secondary windings of the power transformer via a permeable core, and to permit communication of the control information between the secondary circuit assembly and the primary circuit assembly.

In general, in another aspect, the invention features isolation apparatus for transferring control information between primary-side and secondary-side circuitry in a power converter. First communication circuitry electronically modulates a carrier signal with the control information. First and second galvanically isolated communicators send and receive the carrier signal between the primary-side and secondary-side circuitries. Second communication circuitry, in response to a signal delivered by the second communicator, generates an electrical signal corresponding to the control information.

Embodiments of the invention include the following features. The carrier signal comprises a high-frequency electrical oscillation. The first and second communicators comprise conductive windings. The electronic modulation comprises amplitude modulation.

In general, in another aspect, the invention features a method for transferring control information between electromechanically independent primary-side and secondary-side circuitry in a power converter. A carrier signal is modulated with the control information and coupled between the primary-side and the secondary-side via galvanically isolated communicators. The coupled modulated carrier is then detected and demodulated to regenerate the control information.

In general, in another aspect, the invention features a method of manufacturing different power conversion circuits sharing a common general scheme of a primary-side circuit portion galvanically coupled to a source and which interacts with a secondary side circuit portion galvanically coupled to a load, the primary-side and secondary-side circuit portions including communicators for communicating control information between the primary-side and secondary-side circuit portions via a galvanically isolated coupling path, each of the circuits exhibiting one of P different characteristics in its primary-side circuit portion and one of Q different characteristics in its secondary-side circuit portion, there being at least P times Q possible different circuits in the mix. The method includes providing P different supplies of physical components embodying respectively the P different primary-side circuit portions, providing Q different supplies of physical components embodying respectively the Q different secondary-side circuit portions, and combining physical components from among the P supplies with physical components from among the Q supplies to form successive circuits having P times Q possible different characteristics.

Among the advantages of the invention are the following.

The configuration assures galvanic isolation in the order of several thousand volts between the primary and secondary sides of the controller, while permitting magnetic coupling and minimizing capacitive coupling.

The resulting control circuit and converter are extremely compact, and simple and cheap to manufacture. A relatively small number of different versions of the lobes may be used to manufacture converters having a great variety of different operating characteristics.

Other advantages and features will become apparent from the following description, and from the claims.

DESCRIPTION

FIGS. 3A through 3E are end, side, top, side, and end views (in some respects broken away or in section), respectively, of the controller.

FIG. 9 is a chart of performance characteristics of a mix of power converters.

FIGS. 10A and 10B are charts of resistor values for the two lobes.

Figure 11:
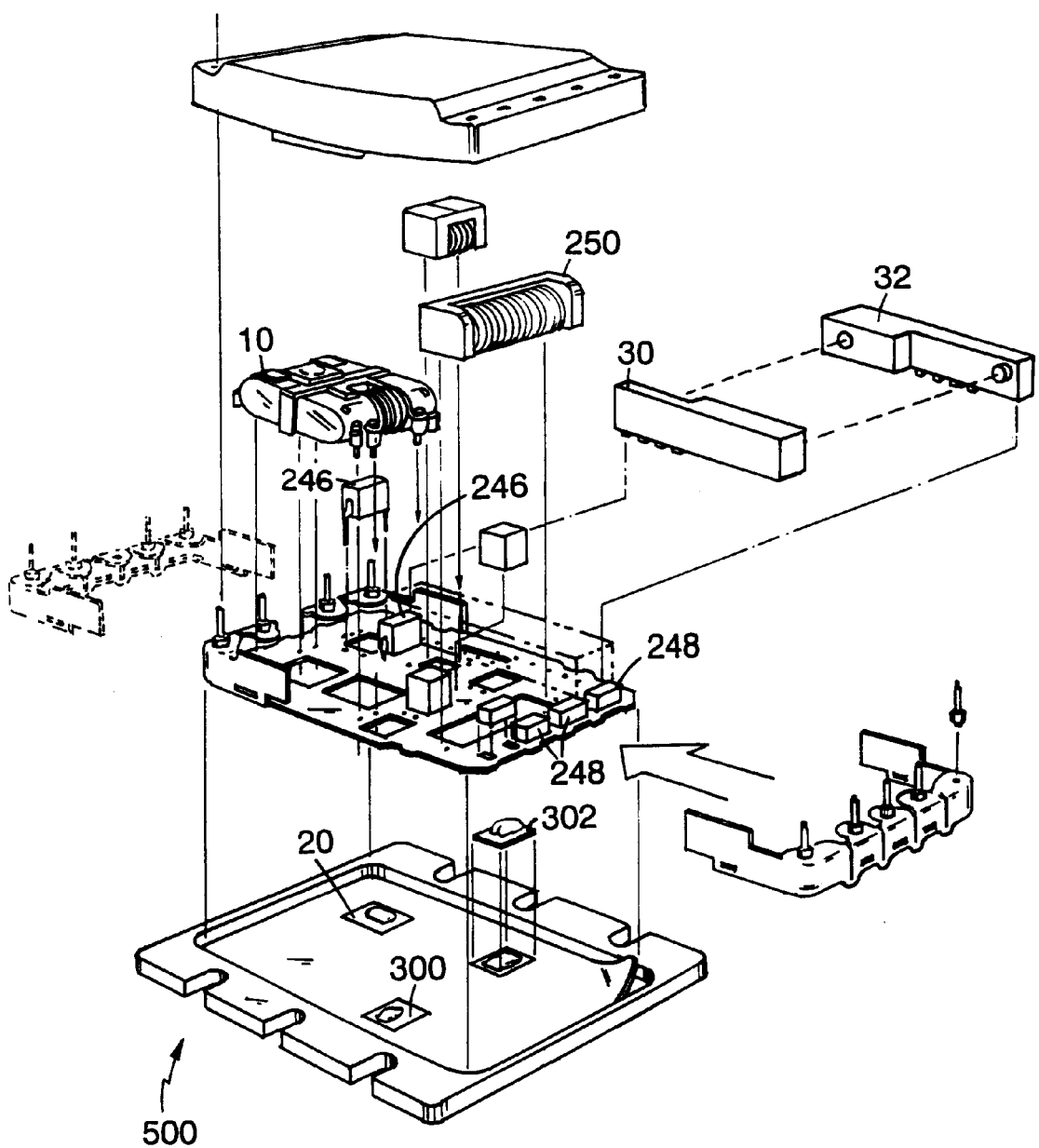
FIG. 11 is an exploded view of a power converter assembly.

FIGS. 13A through H are exploded, perspective, top, side, bottom, side, end, and end views, respectively, of the converter of FIG. 11.

Figure 12:
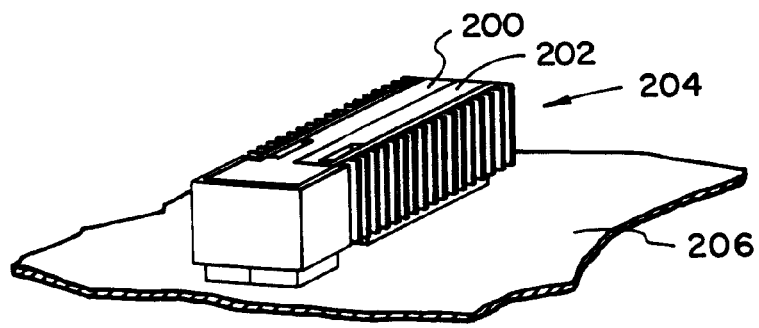
FIG. 12 is a perspective view of a power converter mounted on a circuit board.

FIGS. 14A through 14E are top, side, side, enlarged, and enlarged views (in some respects broken away or in section), respectively, of the converter of FIG. 12.

Figure 15:
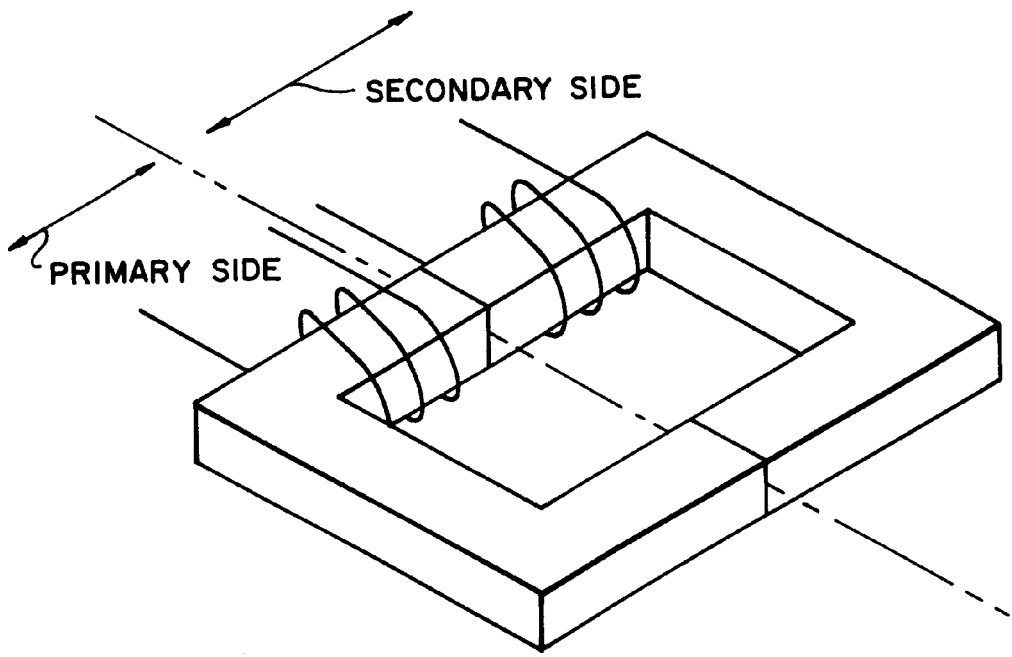
Figure 15:
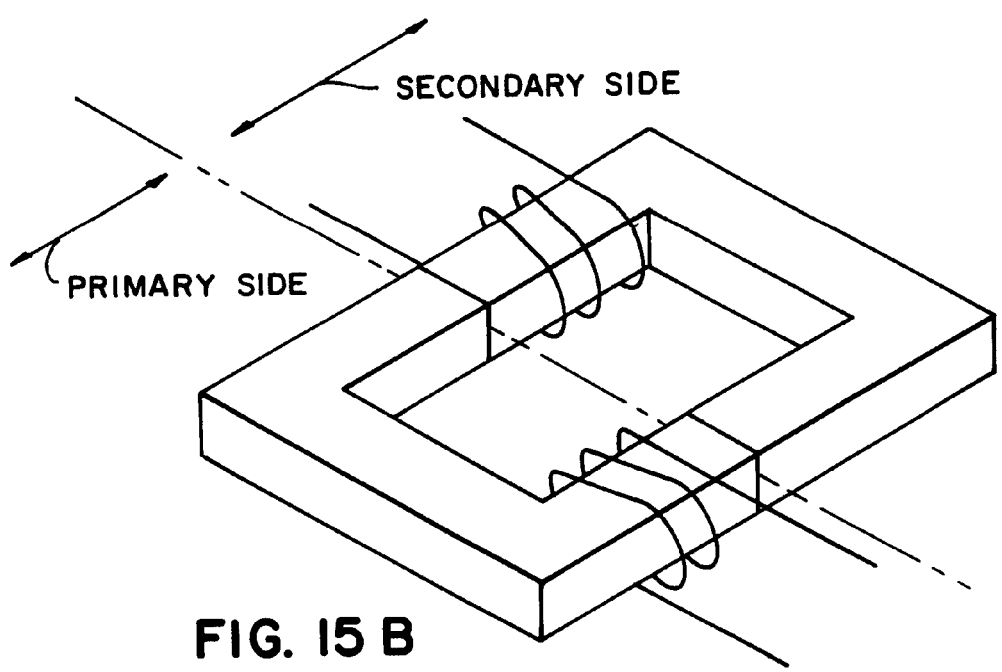
Figure 15C:
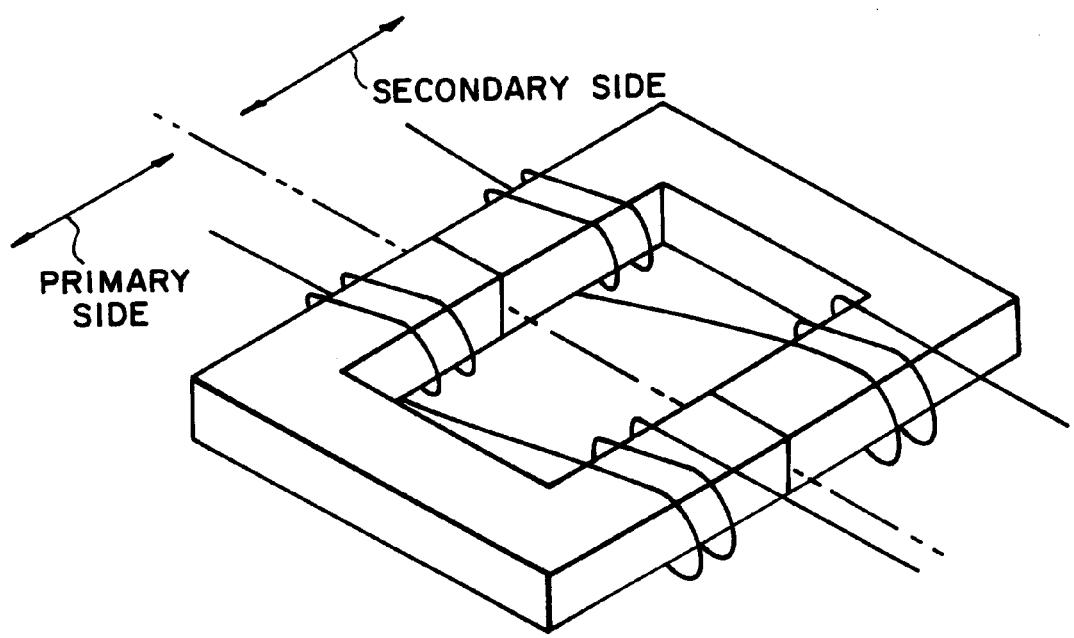

FIGS. 15A through 15C are schematic views of arrangements of transformer windings.

Figure 16:
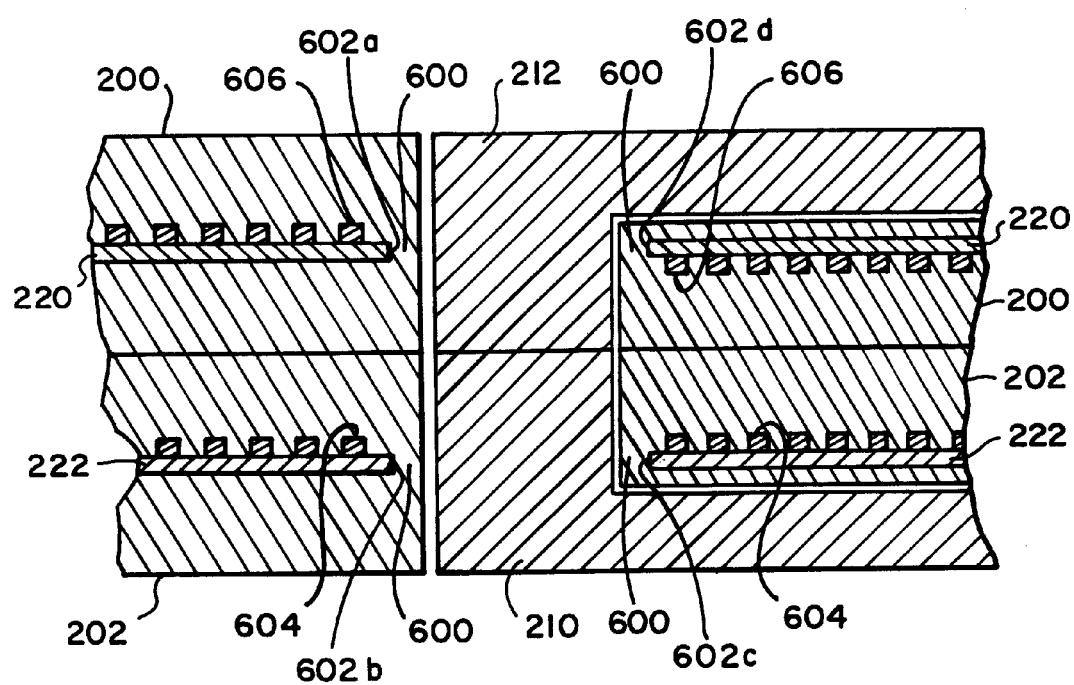

FIG. 16 is a cross section view of a portion of the power converter of FIG. 12.

Figure 17A:
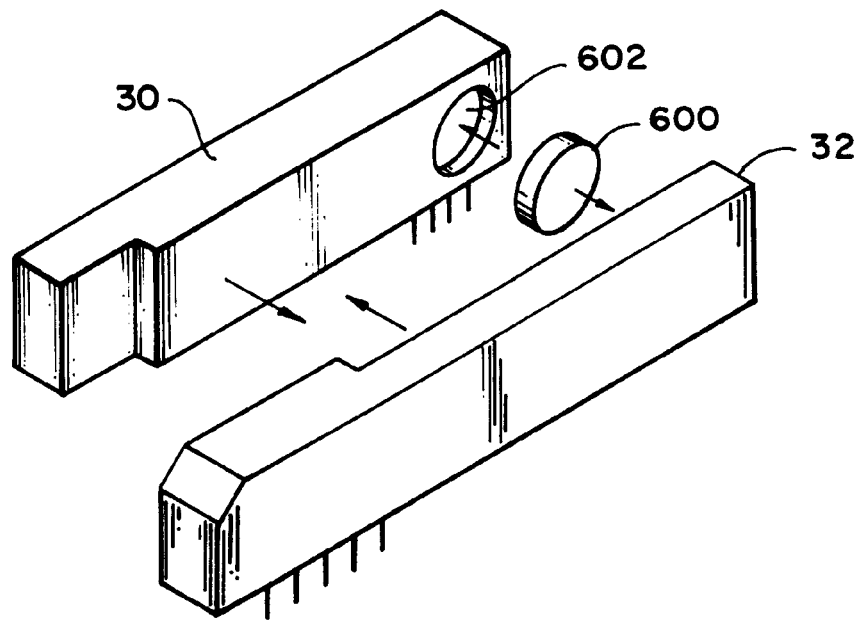
Figure 17B:
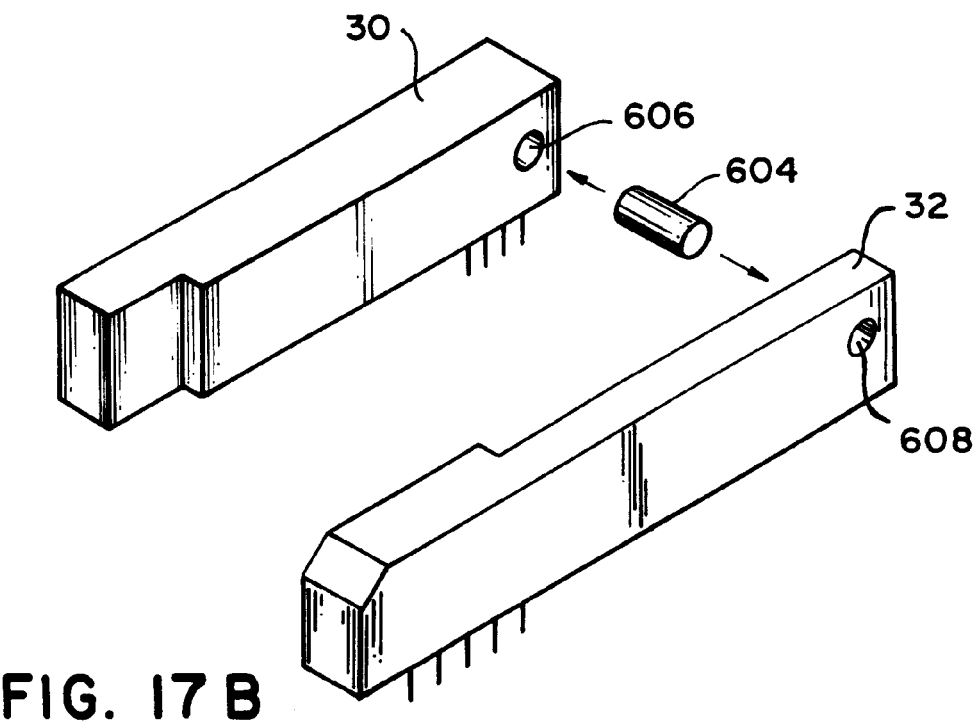

FIGS. 17A and 17B are exploded views of control lobes coupled by permeable core.

Figure 1:
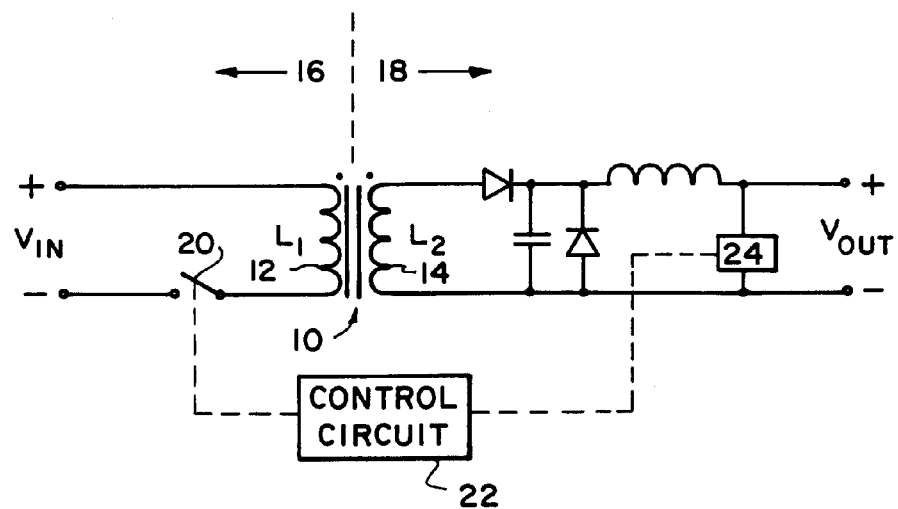
FIG. 1 is a generalized circuit diagram of a zero-current switching power converter.
Figure 2:
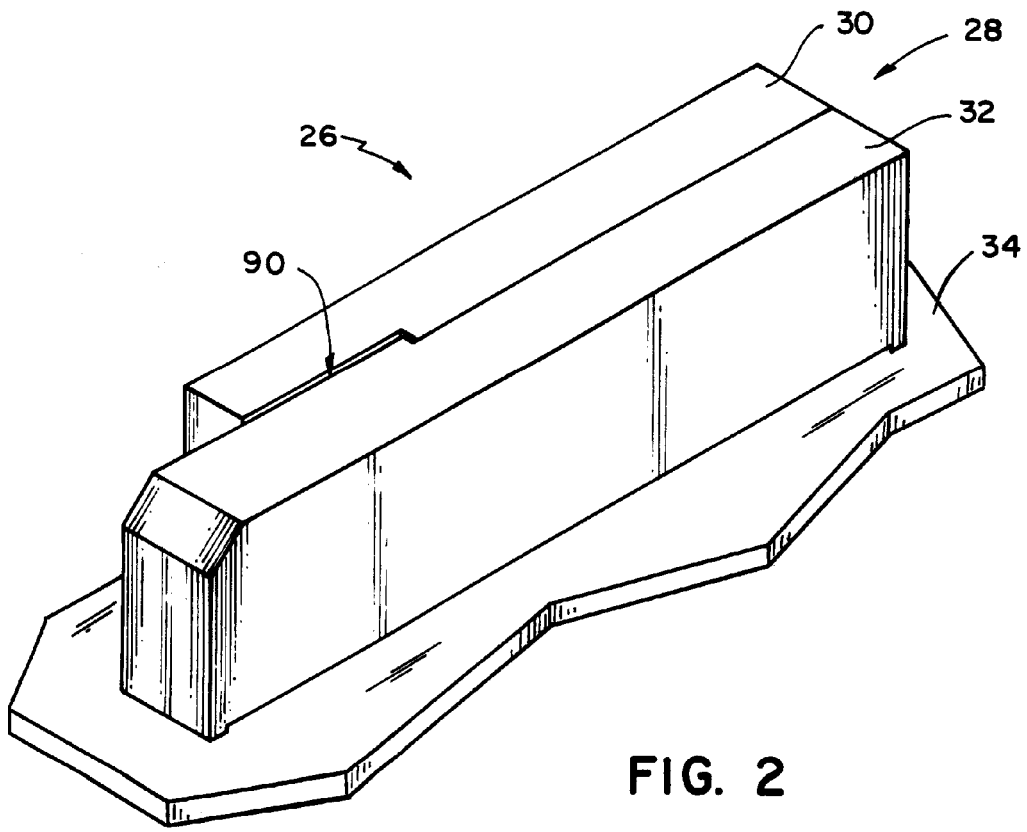
FIG. 2 is a perspective view of a controller for a power converter.

Referring to FIG. 2, a ZCS power converter 26 includes control circuitry 28 having a primary side control subassembly (lobe) 32, and a secondary side control subassembly (lobe) 30, both mounted on a main circuit board 34, along with other power conversion components (not shown). Although the two lobes are mounted together and pass information between them by magnetic coupling, they are independent physical components which are galvanically isolated from one another (e.g., there is no electrical connection between the lobes).

Referring to FIGS. 3A through 3E, control information is passed to the primary side lobe 32 from the secondary side lobe 30 by magnetic coupling between a secondary side winding 42, and a primary side winding 40. As seen in FIG. 3C, the two windings 40, 42 are formed respectively on surfaces 44, 46 of two small circuit boards 48, 50 each of which are separately encapsulated within an insulating material to form the two lobes 32, 30. The two windings are formed on the conductive layers of the two boards by conventional etching of one ounce copper foil. Each coil has four turns in the example shown. The runs of each winding are 8 mils wide with 7 mil spacing between adjacent turns.

The turn width and spacing between adjacent turns is made as small as possible while permitting conventional printed circuit board etching techniques to be used. This minimizes the surface area required for the windings while allowing for economical manufacture of the printed circuit boards. The circuit boards are held within the encapsulant in positions which place the two windings at a spacing of about 0.1" when the two lobes are mounted together. There need not be any permeable core which links the two windings; by appropriate arrangement of the windings and the boards, magnetic coupling can be made to occur through the encapsulant and any air gap between the two lobes.

Figure 5:
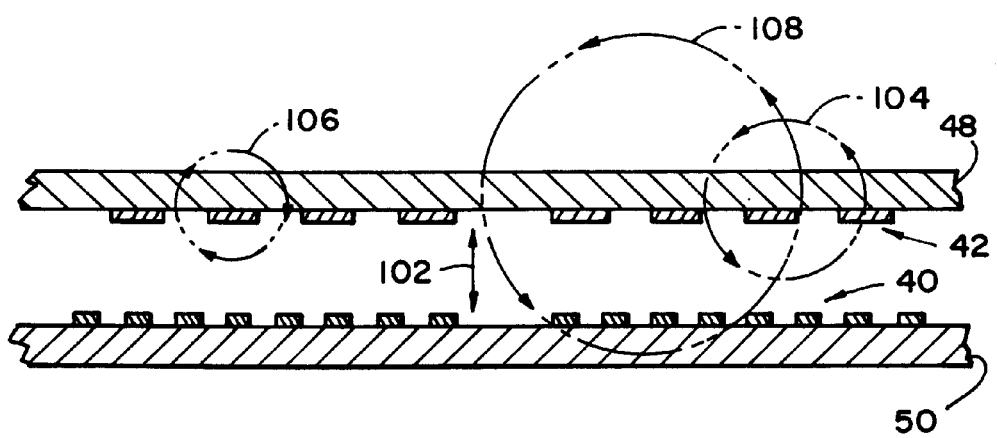
FIG. 5 is a cross sectional view of portions of circuit boards in the two lobes.

A pair of windings which are formed and spaced as described above will result in a "loosely coupled" transformer. This means that only a portion of the magnetic flux which results from current flowing in one of the windings will link the other winding. For example, FIG. 5 shows a cross-section of a pair of windings 40, 42 separated by a nonpermeable space 102. A time-varying current flowing in winding 42 might produce flux lines 104, 106 and 108. Only some of the flux lines (e.g. 108) link winding 40 and induce a voltage in the other winding; the rest of the flux lines (e.g. 104, 106) do not.

In one example, a loosely coupled transformer having eight turns in a secondary winding 42 and two turns in a primary winding 40 (both windings being formed of one ounce copper etch with a winding width of 8 mils and spacing between adjacent turns of 7 mils) with the windings spaced apart by 0.1 inch, the coupling coefficient is nominally 15% (i.e. k=0.15) and the nominal self inductances of the primary and secondary windings are, respectively, 360 nanohenries and 60 nanohenries.

Referring again to FIGS. 3A through 3E, also mounted on the two circuit boards are other circuit components which include a secondary side integrated circuit 53 and two primary side integrated circuits 52, 54. The integrated circuits are all mounted with their top surfaces close to the surface of the encapsulant which overmold the lobes. This minimizes thermal resistance along a path between the top surface of the integrated circuit and the medium surrounding the lobe. Also mounted on the primary and secondary circuit boards are discrete resistors and capacitors 51 (shown in FIGS. 3B and 3D) and discrete parts 33.

A small leakage inductance transformer 66 on the primary side circuit board has two u-shaped permeable core pieces 68, 70 which pass through holes in the board to form a closed permeable path (FIG. 3C). The permeable path links a pair of windings (not shown, but similar to windings 40, 42) which surround the holes on opposite sides of the printed circuit board. Transformer 66 is used as a coupling mechanism for conveying signals from integrated circuit 52 for driving the gate of the main switch 20. Details of this arrangement are described in U.S. patent application Ser. No. 07/805,474, High Efficiency Floating Gate Driver Circuit Using Leakage-Inductance Transformer, filed Dec. 11, 1991, and incorporated by reference (hereinafter referred to as the "Gate Driver application").

Two rows of connection terminals 72, 74, are formed respectively as projections of the circuit board bearing conductive runs on both sides.

The encapsulant for the two lobes is an epoxy material (Novolak, available from Nitto Denko America in San Jose, Calif.).

Figure 4:
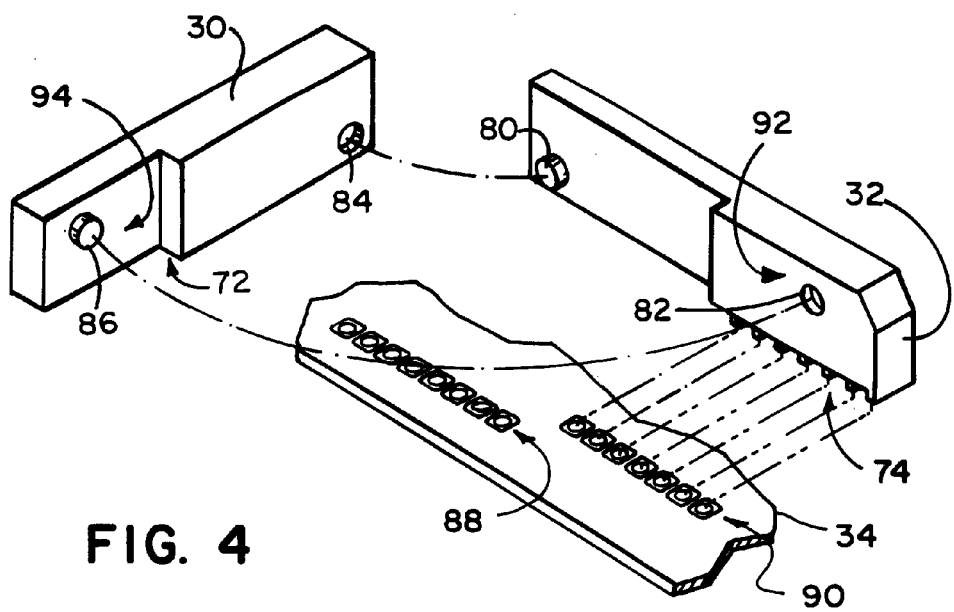
FIG. 4 is an exploded view of two lobes of the controller and a fragment of a circuit board.

Referring also to FIG. 4, the outer walls of lobes 30, 32 have mating male and female plugs and sockets 80, 82, 84, 86. The plugs have outer rims that are slightly larger than the openings of the sockets to give a snapping action when the plugs and sockets are mated. Once connected, the lobes are mounted on board 34 by inserting and soldering the terminals 72, 74 into corresponding rows of holes 88, 90, on circuit board 34. The combination of the snap fastenings and the soldering of the terminals to the circuit board assure strong mechanical support.

Figure 6:
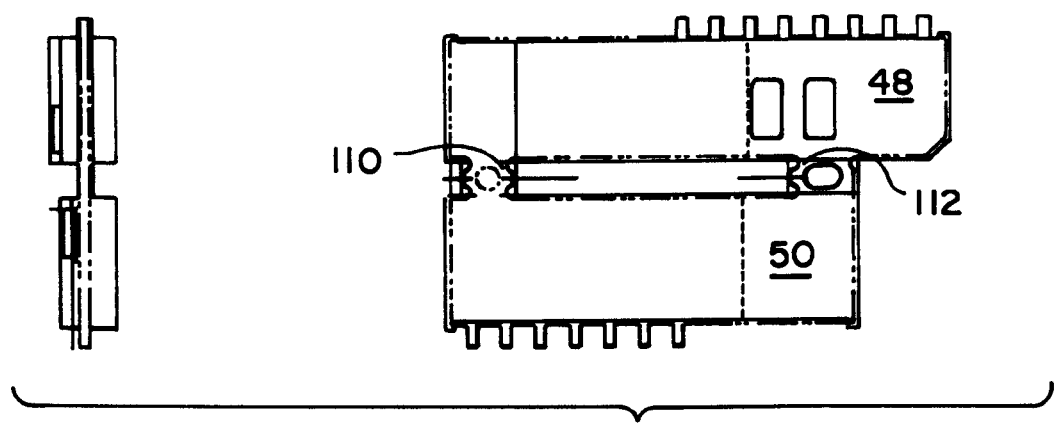
FIG. 6 is a top view of an encapsulation scheme for the two lobes.

Referring to FIG. 6, during one mode of construction, the two small printed circuit boards 48, 50, are linked by bridges 110, 112. After the runs and windings are formed on the boards and the discrete components are mounted, the linked boards are encapsulated in one operation. The encapsulant is shown in solid line in FIG. 6 and provides an overmolding of the internal parts which are shown in broken line. Then the two subassemblies are cut apart (e.g. by routing) to remove the bridges.

Figure 7:
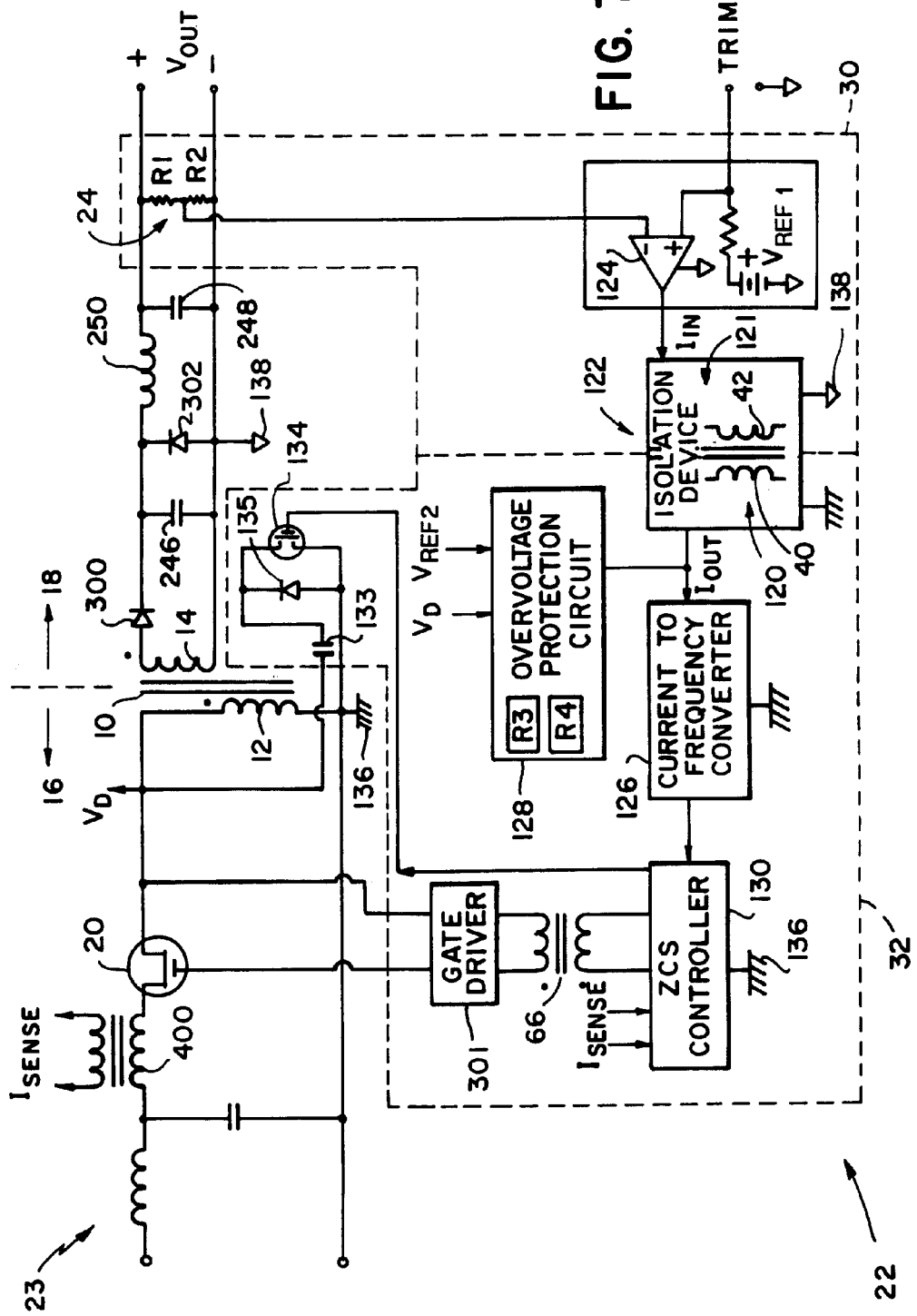
FIG. 7 is a circuit diagram of a zero current switching converter.

Referring to FIG. 7, in one example of a control circuit 22 for a power converter 23, the secondary side lobe 30 includes output voltage sensing divider 24 (the two resistors are among the discrete components 51 shown in FIG. 3B). Divider 24 sends a voltage signal to an error amplifier 124 (which is part of integrated circuit 50 in FIG. 3B) for comparison with a reference voltage Vref1 (also part of circuit 50). An input labelled Trim allows the internal value of Vref1 to be overridden by an externally applied trim voltage for changing the output voltage setpoint of the converter. The output of amplifier 124 is a current Iin which is sent to the secondary side 121 of isolation device 122. The secondary side 121 passes the information about the current Iin to the primary side 120 of the isolation device 122 via magnetic coupling between windings 40, 42 included in the isolation device.

The primary side 120 of the isolation device is part of the primary side lobe 32. Primary side 120 produces an output current Iout which varies in proportion to the value of Iin. An input overvoltage protection circuit 128 (of a kind described in more detail in U.S. patent application Ser. No. 07/947, 937, filed Sep. 21, 1992, and incorporated by reference) is also connected to influence Iout (e.g., to shunt away current during an input overvoltage condition). Also in the primary side lobe are a current-to-frequency converter 126, which receives the Iout information from the primary side of the isolation device and produces a corresponding frequency signal which it delivers to a zero-current switching controller 130 (ZCS controller). A signal, Isense, indicative of the time-varying value of current flowing in switch 20, is also delivered to the zero-current switching controller by a current transformer 400. The zero current switching controller 130 uses the frequency signal and the value of Isense to turn the switch 20 on and off at times of zero current at a rate consistent with regulating the output voltage of the converter at a setpoint value determined by Vref1 (or the Trim input voltage, if used) and the voltage division ratio of divider 24. The ZCS controller 130 sends signals to a gate-driver circuit 301 via a leakage inductance transformer 66 (as described in the Gate Driver application). Gate driver circuit 301 turns switch 20 on and off at times of zero current (as also explained in the Gate Driver application). ZCS controller 130 also sends signals to control the turn-on and turn-off of reset switch 134 (see U.S. Pat. No. 4,441,146).

The primary side ground 136 and the secondary side ground 138 are independent, galvanically isolated, and may float relative to one another.

The isolation device 122 accepts control information, Iin, from the error amplifier in the secondary side lobe 30 and delivers it to the current-to-frequency converter 126 in the primary side lobe 32. The error signal Iin may be an analog current having frequency components in the range from DC to a few hundred Kilohertz. Such a signal could not readily be directly coupled between the windings of a small, loosely coupled, transformer of the kind previously described (i.e. eight turns on secondary winding 42; two turns on primary winding 40; each winding formed of one ounce copper foil, 8 mils wide, 7 mils spacing between adjacent turns; windings spaced 0.1 inches apart). However, such a transformer can be used to transfer higher frequency signals (e.g. in the tens of Megahertz). Therefore, in one implementation of the isolation device 122, a high frequency carrier signal is amplitude modulated by Iin and delivered to winding 42. The high frequency signal is coupled to winding 40 where the high frequency carrier is removed by detector circuitry.

Figure 8:
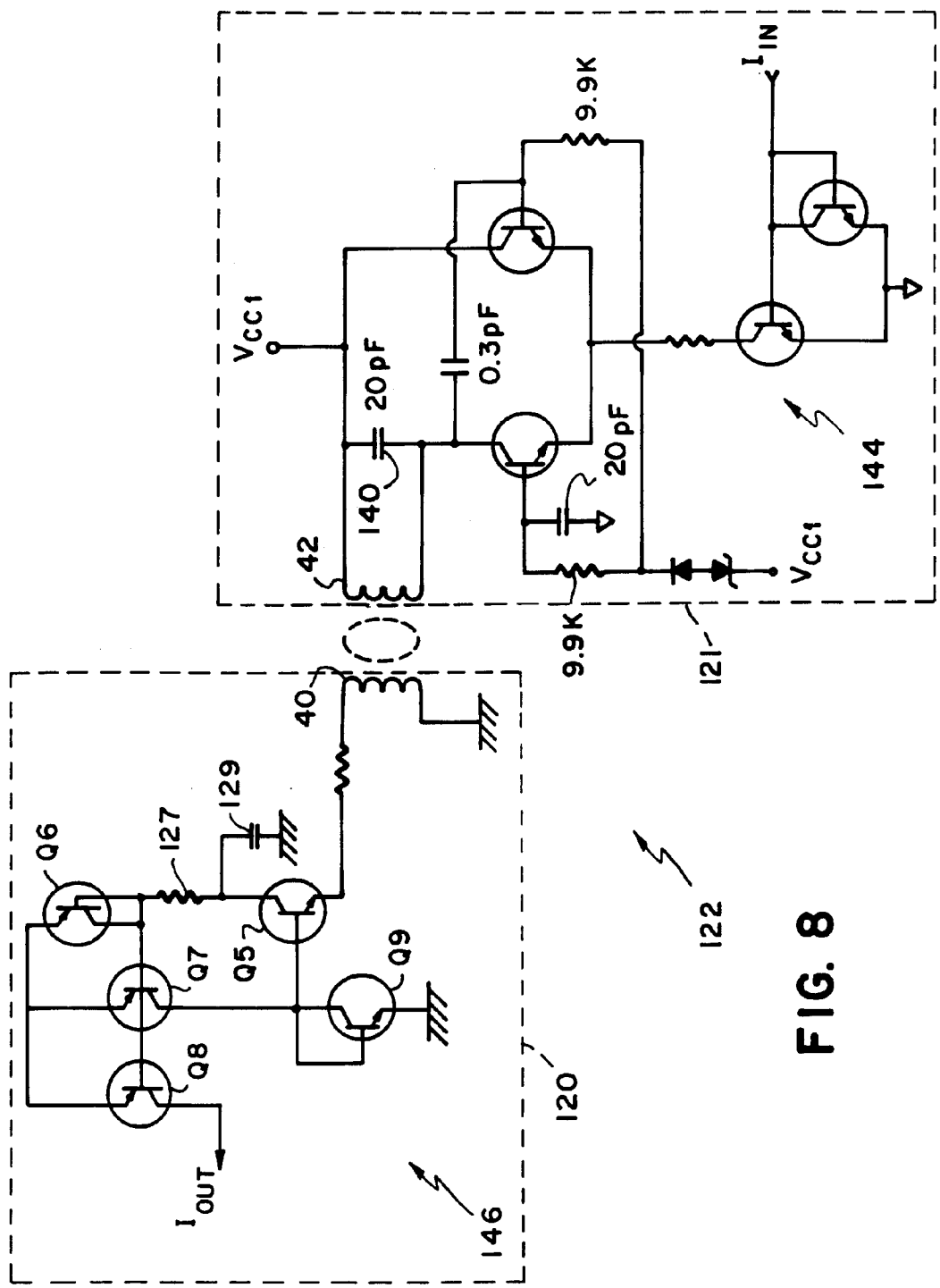
FIG. 8 is a circuit diagram of the isolation device of FIG. 7.

Referring to FIG. 8, in the secondary side 121 of the isolation device 122, the winding 42 is driven by an isolation drive circuit 144 in the form of an AC feedback oscillator in which the frequency of oscillation is determined primarily by the self-inductance of winding 42 (e.g., 360 nH) in combination with the sum of the capacitance of capacitor 140 (20 pF in the example) and the parasitic capacitances of the circuit (e.g. 3 pF). In this example, the operating frequency of the oscillator is on the order of 55 MHz. The amplitude of the oscillation across winding 42 varies with the amplitude of the input current signal Iin.

The magnetic field induced by the secondary side winding 42 couples into and induces a voltage in the primary side winding 40. A ground-based isolation detector 146 on the primary side 120 delivers an output current Iout which varies with the variations in the amplitude of the signal detected on winding 40. The voltage amplitude variations of the AC signal induced across winding 40, in the range of up to 200 millivolts peak, feed an NPN transistor Q5. On the negative going swing of the AC signal the emitter of Q5 is pulled below ground and base current flows in Q5. Q5 is a wide band device, having a cutoff frequency (ft) value in the hundreds of megahertz, so its collector and base currents will follow the negative peaks of the amplitude modulated carrier. The combination of capacitor 129 and resistor 127 cause most of the high frequency carrier frequency component of the collector current of Q5 to flow to ground through the low impedance of the capacitor. The current in resistor 127 feeds a pair of transistors, Q6 and Q7 (wired as a diode), which form a current mirror. Current flowing into Q6 is mirrored in the collectors of Q7 and Q8. Q6, Q7 and Q8 are PNP devices having a cutoff frequency, ft, of only a few Megahertz, so the collector currents in Q7 and Q8 are unresponsive to high frequency carrier components of the current flowing in Q6. Thus the current flowing in the collectors of Q7 and Q8 have an average value proportional to the amplitude of the amplitude modulated signal and is therefore proportional to Iin. That current is mirrored as Iout from Q8. Thus Iout follows Iin. The current mirrored out of Q7 flows into Q9 (wired as a diode) which is of the same type as Q5. The variation in voltage across Q9 resulting from variations in the amplitude of the current in the collector of Q7 helps to maintain the base voltage of Q5 at a value which ensures that the emitter of Q5 is within a few tens of millivolts of ground. This improves the linearity and precision of the detector.

Amplitude modulation is only one method for passing control information between windings using a high frequency carrier. Other modulation techniques, such as frequency modulation, could be used.

Referring again to FIGS. 3C and 7, integrated circuit 52 includes the current to frequency converter 126, the ZCS controller 130, and the overvoltage protection circuitry. Integrated circuit 54 includes the reset switch 134 and diode 135 and may also contain the gate driver 301 for driving the gate of the main switch 20. In FIG. 3C integrated circuit 54 and reset capacitor 133 are seen to be located at an end of primary PCB 48 which extends in length beyond the end of the secondary PCB 50. This is done because voltage waveforms associated with these components (e.g., 54, 133) can exhibit large changes in voltage with rapid rise and fall times (e.g., in a unit which operates with a 400 VDC input source, the voltage labelled Vd in FIG. 7 might typically change by 550 Volts with rise and fall times on the order of 20 nanoseconds). By placing the components as shown, parasitic capacitive coupling between these primary-side components and the secondary PCB 50 is minimized and spurious coupling of undesirable noise signals between primary and secondary, associated with high rates of change of voltage, is minimized.

One of the benefits of having two electromechanically independent lobes 30, 32 derives from the fact that, in almost all cases, the component values which are used in the primary (secondary) circuitry of a DC—DC converter are dependent only upon primary (secondary) functional specifications and may be selected independently of secondary (primary) functional specifications. Thus, for example, while there are many possible combinations of input and output voltage specifications which may apply to a DC—DC converter, each such combination will typically "factorize" into a set of primary side components whose values are solely a function of the converter input voltage and a set of secondary side components whose values are solely a function of the converter output voltage.

As an example, referring to FIG. 9 and again to FIG. 7, there are shown eighteen different possible converters which can be formed to serve combinations of input voltage (Vin) and output voltage (Vout). Each of the six different possible output voltages requires a different combination of values of R1 and R2 (the two resistors that form the voltage divider 24, FIG. 7, in the converter secondary circuitry). Each combination of values is associated with a specific value of output voltage and is independent of the value of input voltage. The breakdown voltage of the FET, Vdmax, and hence the type of FET (in the converter primary circuitry), is determined solely as a function of input voltage and is independent of output voltage. The values of the two resistors R3 and R4 (in the overvoltage protection circuitry in the converter primary circuitry), as discussed in U.S. patent application Ser. No. 07/947,937, are, in turn, solely a function of Vdmax (and therefore of input voltage) and are independent of output voltage.

Referring to FIGS. 10A and 10B, by fabricating only three different types of primary lobes, listed in FIG. 10A, and six different secondary lobes, listed in FIG. 10B (i.e., a total of nine different lobes), one can assemble all eighteen of the different power converters listed in FIG. 9. The ratio of number of different lobes to the number of possible converters becomes even more favorable for larger numbers of different converters. For example, various combinations of ten different primary lobes and ten different secondary lobes (i.e., a total of only twenty different lobes) could be assembled to form 100 different power converters.

Thus, by assembling two separate kinds of control circuitry lobes (i.e. primary and secondary), each of components having values which are characteristic of a given input or output voltage, the manufacture of a great many converters can be accomplished with a much smaller total number of lobes. This enables the manufacture of, say, N different power converters having a range of different input and output characteristics, using considerably fewer than N (say M) different primary and secondary lobes and assembling appropriate combinations of the lobes to provide control circuits for the N different converters. Since the lobes are electromechanically independent the selection and assembly of the lobes is greatly simplified.

Converter characteristics other than output voltage setpoint and input overvoltage setpoint, also lend themselves to factorization in manufacturing. For example, values of components used to set secondary side parameters such as the output "current limit" value, foldback current limiting characteristics, and output overvoltage protection limits are functions solely of the desired set of secondary side characteristics (e.g. output voltage, output current) and are independent of primary side characteristics (e.g. input voltage). Likewise, values of components which might be used to set primary side parameters, such as an input undervoltage shutdown limit, are functions solely of the desired set of primary characteristics (e.g. input voltage) and are independent of converter secondary side characteristics (e.g. output voltage, output current). Placing control circuitry into electromechanically independent sets of primary and secondary lobes (as described above) is especially appropriate where it is impractical to incorporate power transfer components onto the lobes, as, for example, in a converter which is designed to convert relatively high levels of power (e.g., above 50 watts). One such converter, of a kind similar to the ones described in Vinciarelli, "Packaging Electrical Components", U.S. patent application Ser. No. 07/914,347 (incorporated herein by reference), is shown in FIG. 11. Converter assembly 500 is of a kind suitable for converting from 50 to 150 Watts of DC power. In such a converter, power transfer components (see FIG. 7) such as the transformer 10, the capacitors 246, 248, and the output inductor 250 are large relative to the control circuit lobes 30, 32 and therefore are not packaged as part of the lobes. Also, because of the relative size of the diodes 300, 302 and the FET switch 20, and the need to remove heat from these components they too are not included in the lobes.

For lower power converters (e.g. up to 50 Watts), there is less difference in the relative size of the power transfer components compared with control and other circuitry, and the power transfer components may be incorporated directly onto the same boards that incorporate the remainder of the primary side and secondary side circuitry. Referring to FIGS. 12 and 13A through H, for example, a converter is formed of a primary converter section 202 and a secondary converter section 200, which can be snapped together. By adding two permeable cores 210, 212 and an extruded aluminum heatsink 208, an extremely compact complete power converter 204 is formed.

Referring to FIGS. 14A through 14E, to the right of demarcation line 224 boards 220, 222 are similar to boards 50, 48 of FIG. 3C. To the left of demarcation line 224, additional power conversion components are mounted. One key component is the power conversion transformer 230 having secondary and primary windings 232, 234, formed on respective boards 222, 220, and the two permeable cores 210, 212, which seat within four rectangular holes 236, 238, 240, 242, on the two boards. In FIGS. 14A through 14E, each of the windings 240 and 242 is shown to be wound around holes which surround different sides of the permeable cores. As shown schematically in FIGS. 15A through 15C, however, the windings can be arranged in a variety of ways relative to each other, and the leakage inductance of the transformer will vary with the winding arrangement.

In FIG. 15A the windings are arranged on the same side of the core; in FIG. 15B the windings are arranged on opposite sides of the core; in FIG. 15C pairs of windings are arranged on each side of the core such that both the primary and secondary windings are formed of a series-connected winding pair. In general, transformers having windings which are wound on the same side of the core (e.g. FIG. 15A) will exhibit lower values of leakage inductance than those having windings wound on opposite sides of the core.

In FIGS. 14A through 14E, the circuit boards 220, 222 are multilayer boards (e.g., six layers) and the windings 240 and 242 are built up by series or parallel connections (via plated through holes) of subwindings formed one above the other on the multiple layers of the board. For a converter of the scale shown in FIG. 14, this can economically yield windings having as few as one turn (i.e. each layer having a single turn winding with all windings in all six layers arranged in parallel) to as many as forty-two turns (i.e., each layer having a seven turn winding with all windings in all six layers arranged in series). The primary and secondary windings may have different turns to define different turns ratios for the transformer.

As shown in FIG. 16, the encapsulating material 600 flows around the edges of the circuit boards 602a through 602d which surround the perimeter of each of the four holes. This provides insulation to preclude any conduction path from conductive run 604 on one board to conductive run 606 on the other board via the core.

Figure 13A:
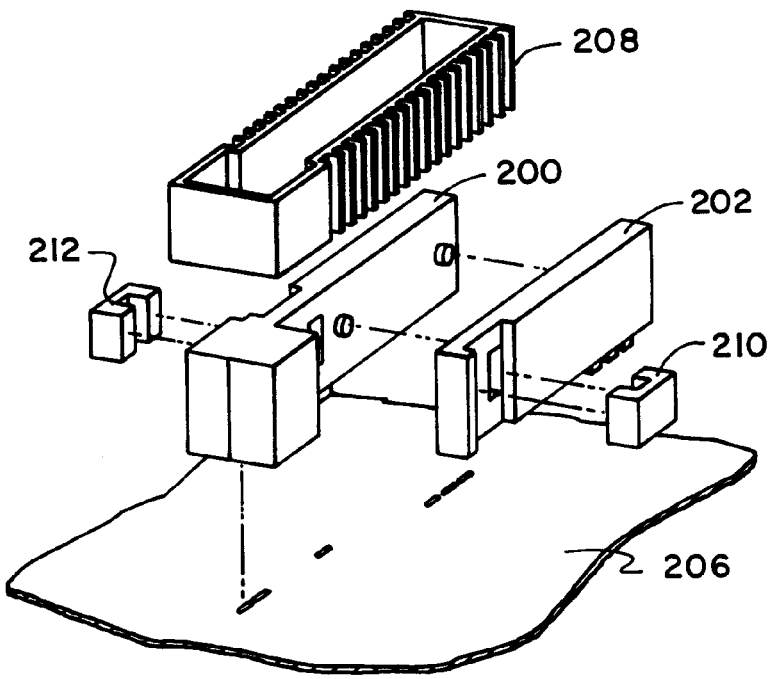
Figure 13:
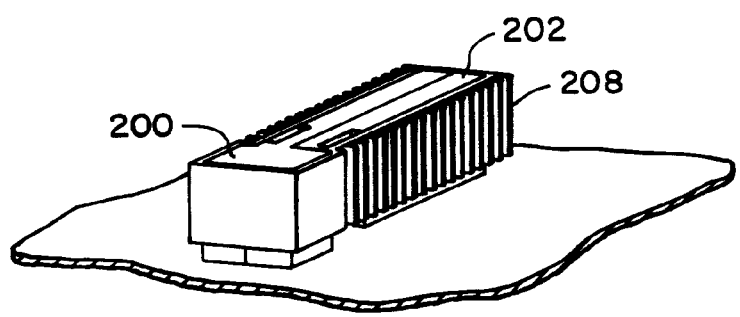
Figure 13:
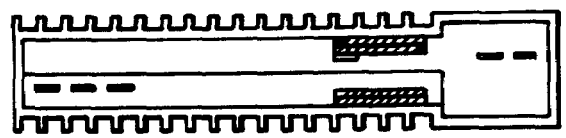
Figure 13G:
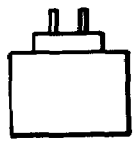
Figure 13:
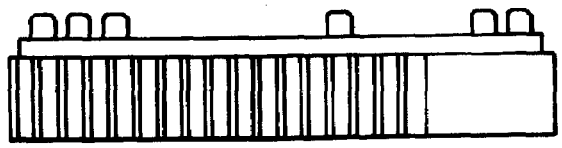
Figure 13:
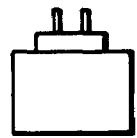
Figure 13:
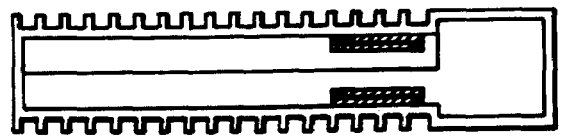
Figure 13:
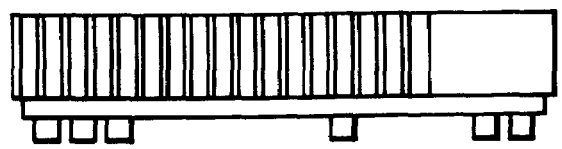

Just as the value of control circuit components may be "factorized" (e.g. various primary side and secondary side component values are, respectively, solely a function of desired primary and secondary operating characteristics), so too may numbers of primary and secondary turns. This is because the number of primary and secondary turns are related to input and output voltage, respectively, by the "volt-second" capability of the transformer core. Thus, the same factorization strategy (above) for combining a relatively few electromechanically separate primary and secondary lobe assemblies into a much larger number of useful converters may also be applied to the complete power converter of FIGS. 12 through 14.

Other components of the power converter include an integrated circuit 244 containing two diodes (e.g., 300, 302 in FIG. 7), a resonant capacitor 246, an output filter capacitor 248, and an output filter choke 250.

The power conversion components all are mounted with their top surfaces close to the surface of the encapsulant overmolding of the lobes, to minimize thermal resistance along a path between the top surface of the integrated circuit and the heat sinking sleeve 208.

The terminal pins for the converter may be formed of separate metal pieces attached to the circuit boards. The pins include + and − input 290, 292, and + and − output and Trim pins 294, 296, 298.

The electromechanical independence of the two lobes (e.g., 30, 32 of FIGS. 2 and 11; and 200 and 202 of FIGS. 12 and 13A through H) results from modulating a relatively high frequency carrier signal (e.g., greater than 10 MHz) with control information having an information bandwidth much lower than the carrier frequency (e.g., a bandwidth of a few hundred Kilohertz). In this way a pair of small, space-efficient, galvanically isolated windings may be used (i.e. as a loosely coupled transformer) to convey information between secondary and primary without the need for a closed permeable path linking the windings. In the examples shown in FIGS. 3, 5 and 14, the windings are coupled entirely through nonpermeable material. A small amount of permeable material may be used in the vicinity of the windings to increase coupling, without sacrificing other advantages.

For example, in FIG. 17A a permeable disk 600 is shown being used to increase coupling between the control windings (the windings, not shown, lie within each lobe 30, 32 on either side of the disk). The disk fits within recesses (e.g. recess 602) formed in the encapsulating material used to overmold the lobes; in FIG. 17B a small permeable rod 604 serves a similar purpose (the rod passing through holes 606, 608 in each lobe and thus pass through the center of each winding). The permeable material could be molded into either lobe or, as shown, could be added as separate pieces. In each case the electromechanical independence of the lobes is not compromised by the presence of the permeable material; the material does not form a closed path which links the lobes.

Other embodiments are within the following claims.

For example, other types of control information may be fed back from the secondary side to the primary side. The feedback could include passing information from the primary side to the secondary side.

A variety of turns ratios could be used on the isolation windings, for example, 1:1 2:1 3:1, where the first number represents the turns on the primary side.

What is claimed is:

1. Apparatus comprising power converter circuitry having first circuitry encapsulated to form a first discrete physical unit and connected to respond to control information received from second circuitry encapsulated to form a second discrete physical unit, the two physical units respectively including subparts of a device for conveying said control information via a galvanically isolated electromagnetic path.

2. The apparatus of claim 1 further comprising:
primary-side circuitry mounted on a primary-side substrate and including a primary-side communicator for sending or receiving said control information used in controlling the power conversion, and
secondary-side circuitry mounted on a secondary-side substrate and including a secondary-side communicator for sending or receiving said control information.

3. The apparatus of claim 2 wherein
said primary-side circuitry includes low power primary-side components mounted on a low-power side of said primary-side substrate, and heat dissipating primary-side components mounted on a heat dissipation side of said primary-side substrate,
said secondary-side circuitry includes low power secondary-side components mounted on a low power side of said secondary-side substrate, and
said low-power sides of said primary-side and secondary-side substrates generally face one another to define an inner space between them with the low power components in the inner space.

4. The apparatus of claim 2 wherein said primary-side and secondary-side substrates are held parallel.

5. The apparatus of claim 2 wherein the primary-side and secondary-side substrates define an edge of the power converter circuitry and further comprising conductive terminations along the edge for mounting the power converter circuitry on a circuit board.

6. The apparatus of claim 2 wherein the primary-side and secondary-side substrates are mechanically separable from one another, galvanically isolated from one another, and configured to be placed in positions relative to one another to enable said primary-side and secondary-side communicators to cooperate to pass said control information.

7. The apparatus of claim 2 wherein said primary-side circuitry includes a primary winding of a transformer and said secondary-side circuitry includes a secondary winding of said transformer said windings being galvanically isolated.

8. The apparatus of claim 2 wherein said communicators comprise windings and said control information is passed by electromagnetic coupling between said windings.

9. The apparatus of claim 8 wherein said coupling is achieved without a permeable core linking said windings.

10. The apparatus of claim 2 wherein at least one of said primary-side and secondary-side circuitries includes a heat dissipating component mounted on a heat dissipation side of the corresponding substrate.

11. The apparatus of claim 10 wherein each of the primary-side and secondary-side substrates are mounted with the heat dissipation side generally facing away from the other substrate.

12. The apparatus of claim 2 wherein the first circuitry comprises the primary-side circuitry, the first discrete physical unit comprises the primary-side substrate, the second circuitry comprises the secondary-side circuitry, and the second discrete physical unit comprises the secondary-side substrate.

13. The apparatus of claim 2 wherein the second circuitry comprises the primary-side circuitry, the second discrete physical unit comprises the primary-side substrate, the first circuitry comprises the secondary-side circuitry, and the first discrete physical unit comprises the secondary-side substrate.

14. The apparatus of claim 2 wherein the second circuitry is configured and adapted to electronically modulate a carrier signal with said control information, and
the first circuitry is configured and adapted to generate an electrical signal corresponding to said control information in response to a signal delivered by said second circuitry.

15. The apparatus of claim 2 wherein the second circuitry is configured and adapted to electronically modulate a high frequency carrier signal with said control information, and,
the first circuitry is configured and adapted to generate an electrical signal corresponding to said control information in response to a signal delivered by said second circuitry.

* * * * *